(12) United States Patent
Belotserkovskiy et al.

(10) Patent No.: US 6,453,210 B1
(45) Date of Patent: Sep. 17, 2002

(54) AUTONOMOUS CONTROL METHOD AND PROCESS FOR AN INVESTMENT CASTING SHELL

(75) Inventors: Aleksandr Belotserkovskiy; Tao-Li Hsu, both of Birmingham; Jack L. Walton, Helena; Darren Ash, Pell City, all of AL (US)

(73) Assignee: Vulcan Engineering Company, Inc., Helena, AL (US)

( * ) Notice: Subject to any disclaimer, the term of this patent is extended or adjusted under 35 U.S.C. 154(b) by 0 days.

(21) Appl. No.: 09/121,496

(22) Filed: Jul. 23, 1998

(51) Int. Cl.⁷ .............................................. G06F 19/00

(52) U.S. Cl. .................. 700/96; 700/146; 700/117; 700/116

(58) Field of Search .............................. 700/2, 7, 9, 17, 700/79, 86, 117, 96, 116, 118, 121, 146, 169, 201, 200, 83; 164/165, 166, 361

(56) References Cited

U.S. PATENT DOCUMENTS

| | | | |
|---|---|---|---|
| 4,566,061 A | * 1/1986 | Ogden et al. | .................. 700/17 |
| 4,908,746 A | 3/1990 | Vaughn | ....................... 364/142 |
| 5,325,522 A | 6/1994 | Vaughn | ....................... 395/600 |
| 5,517,404 A | * 5/1996 | Biber et al. | ..................... 700/9 |
| 6,145,022 A | * 11/2000 | Takizawa et al. | ............. 710/10 |

* cited by examiner

*Primary Examiner*—Leo Picard
*Assistant Examiner*—Steven R. Garland
(74) *Attorney, Agent, or Firm*—Robert J. Veal; Christopher A. Holland; Burr & Forman LLP

(57) ABSTRACT

A predictive industrial control system for controlling individual cells of machines through multiple Programmable Logic Controllers in an investment casting processing and handling operation. An application server located in a remote, non-industrial environment executes an industrial control application (ICA) utilizing tagged reference names corresponding to individual machines and information input devices such as sensors on the production line. The ICA accesses local databases that hold casting shell part numbers and their associated recipe control words, and monitors the system for new shell part numbers as they appear on a load conveyor in the production line. Radio Frequency tags on the part signal the ICA to transfer the appropriate recipe control words and robot moves required to process the part in a primary processing cell's PLC. The PLC then controls each machine in the primary processing cell in accordance with the downloaded commands from the ICA. The control program downloaded into the PLC at boot-up is written such that machines connected to the PLC may operate independently from the ICA during a selected number of dip cycles. Since processing instructions are downloaded in a predictive manner well ahead of any situation requiring new instructions, the processing of the ICA instructions on the remote server or communications on a slow industrial network does not limit the processing throughput of each cell; and therefore, the production line throughput. The system allows for alteration of the sequence of processing steps from automatic to manual modes as desired without seriously hampering the system throughput.

15 Claims, 12 Drawing Sheets

FIG. 4

RECIPE

| Recipe | Max. Cycle | Description |
|---|---|---|
| 11329 | 8 | Six Vane, With Sawdust |
| 11345 | 9 | Vane Segment with 3 Sawdusts |
| 11350 | 8 | Small Wax Nozzle |
| 11356 | 8 | Blade |
| 11358 | 8 | Small Nozzle |
| 11361 | 9 | Nozzle 1 |
| 11363 | 8 | Nozzle 2 |
| 11364 | 7 | Nozzle 3 |
| 11370 | 6 | Small Nozzle 2 |
| 11371 | 9 | Medium Blade W/Sawdust |

FIG. 5

Current Recipe 11345   Description Vane Segment with 3 Sawdusts

DIP CYCLE

| CY | Robot A | Robot B | Robot P | Pickup RD | Pickup W | Pickup FN | Setdown RD | Setdown W | Setdown FN | Dry Time | MSG | 1 | 2 | 3 | 4 | 5 | 6 | 7 | 8 | 9 | Prs | Rot | Description |
|---|---|---|---|---|---|---|---|---|---|---|---|---|---|---|---|---|---|---|---|---|---|---|---|
| 1 | X |  |  |  |  |  |  |  |  | 110 | 0 | 203 | 221 | 500 |  |  |  |  |  |  |  |  | None |
| 2 | X |  |  |  |  |  |  |  |  | 110 | 0 | 51 | 303 | 321 | 600 |  |  |  |  |  |  |  | None |
| 3 | X |  |  |  |  |  |  |  |  | 110 | 0 | 403 | 428 | 700 |  |  |  |  |  |  |  |  | None |
| 4 | X |  |  |  |  |  |  |  |  | 110 | 0 | 801 |  |  |  |  |  |  |  |  |  |  | None |
| 5 | X |  |  | X | X |  | X |  |  | 110 | 0 | 403 | 428 | 700 |  |  |  |  |  |  | 30 | 50 |  |
| 6 | X |  |  | X | X |  | X |  |  | 110 | 0 | 403 | 428 | 700 |  |  |  |  |  |  | 30 | 50 |  |
| 7 | X |  |  | X | X |  | X |  |  | 110 | 0 | 403 | 428 | 600 |  |  |  |  |  |  | 30 | 50 |  |
| 8 | X |  |  | X | X |  | X |  |  | 110 | 0 | 403 | 428 | 600 |  |  |  |  |  |  | 30 | 50 |  |
| 9 | X |  |  | X | X |  | X |  |  | 110 | 0 | 403 | 471 |  |  |  |  |  |  |  | 30 | 50 |  |
| 10 |  |  |  |  |  |  |  |  |  | 0 | 0 |  |  |  |  |  |  |  |  |  |  |  | None |

ROBOT PROGRAM EDIT

| Program | Xref. | Description |
|---|---|---|
| 326 | | #2 PRIME SPECIAL NOZZLE |
| 341 | | TEST, Place In Tank 3 |
| 342 | | TEST, Drain In Tank 3 |
| 401 | | STANDARD CONCRETE SOAK |
| 402 | | SHARP ANGLE SOAK, CONCRETE |
| 403 | | MEDIUM ANGLE CONCRETE SOAK |
| 421 | | STANDARD CONCRETE DRAIN |
| 422 | | NOZZLE DRAIN, DRAIN |
| 423 | | DRAIN DOWN CONCRETE |
| 428 | | STD ANGLE W/LONGER DRAIN TIME |

FIG. 6

ROBOT PROGRAM EDIT

| Program | Xref. | Description |
|---|---|---|
| 602 | | DF18F0 WITH ANGLE |
| 621 | | STANDARD DF180F0   SAND |
| 622 | | FLUID THEN ...... |
| 700 | | STANDARD SAWDUST |
| 800 | | VERTICAL DRAIN PREWET |
| 801 | | PREWET WITH ANGLE DRAIN |
| 802 | | PREWET PRIOR TO DIPPING |
| 805 | | TEST, Dip In Prewet |

FIG.7

| | | | |
|---|---|---:|---:|
| | Ready for data 1=YES, 0=NO | 0 | 15 |
| Performing Robot | Primary Robot P | 0 | 14 |
| | Backup Robot A | 0 | 13 |
| | Backup Robot B | 1 | 12 |
| | Reserved | 0 | 11 |
| | Reserved | 0 | 10 |
| Pickup From Conveyor | PKP From Transfer Conveyor | 1 | 9 |
| | PKP from Final Dry Conveyor | 0 | 8 |
| | PKP from Rapid Dry Conveyor | 1 | 7 |
| | PKP from Load Conveyor | 0 | 6 |
| Set Down To Conveyor | STDN to Transfer Conveyor | 0 | 5 |
| | STDN to Final Dry Conveyor | 0 | 4 |
| | STDN to Rapid Dry Conveyor | 1 | 3 |
| | STDN to Load Conveyor | 0 | 2 |
| | Last Cycle bit 1=YES, 0=NO | 0 | 1 |
| | Hanger Has Been Erased | 0 | 0 |

FIG. 8

PLC MEMORY

Memory Loc 1

| | | | |
|---|---|---|---|
| CTRL Code | 4744 | Move 1 | 403 |
| RF Tag | 123 | Move 2 | 428 |
| Next Dip | 5 | Move 3 | 700 |
| Current Move | 403 | Move 4 | 0 |
| Current Dry Time | 50 | Move 5 | 0 |
| Next Drytime | 110 | Move 6 | 0 |
| Hanger Status | 0 | Move 7 | 0 |
| Month | 1 | Move 8 | 0 |
| Day | 21 | Move 9 | 0 |
| Hour | 13 | Move 10 | 0 |
| Minute | 34 | Move 11 | 0 |
| Pressure | 30 | Move 12 | 0 |
| Rotation | 50 | Move 13 | 0 |
| Blow Off Time | 15 | Move 14 | 0 |
| | | Move 15 | 0 |
| | | Move 16 | 0 |
| | | Move 17 | 0 |
| | | Move 18 | 0 |
| | | Move 19 | 0 |
| | | Move 20 | 0 |

FIG. 9

PATH ANALYSIS PROCEDURE

EMPTY HANGER RETURN PROCEDURE

AUTONOMOUS CONTROL METHOD AND PROCESS FOR AN INVESTMENT CASTING SHELL

FIELD OF THE INVENTION

The present invention relates generally to industrial control systems. In particular, the invention pertains to control methods for investment casting shell handling systems, and methods of autonomous control of groups of machines through a programmable logic controller.

BACKGROUND OF THE INVENTION

Investment casting systems have recently increased in complexity to fabricate more intricate and complex metal parts. In the past, producing an investment casting required the relatively simple steps of surrounding a wax or foam mold with sand in a gondola into which the molten metal is poured in a sacrificial or molten replacement of the mold. Automation consisted of moving a gondola mounted on a railed conveyor to a particular station at which a particular processing step of the casting within the gondola carrier was completed. Mainly, these steps consisted of pouring sand into the gondola to surround the sacrificial mold and then pouring a metal alloy into the mold. Control systems consisted of operator initiated switching and preset loading operations based upon gondola positioning. Intelligent control was a human operator initiating each machine in sequence based upon known timing constraints.

However, investment casting steps have evolved to be able to produce far more complex parts using a variety of alloys. Today, casting "shells" made up of successive layers of ceramic materials are built up around a sacrificial wax or foam mold. These shells fully encase the mold and functionally replace the bulky gondola and sand supports previously used. Once a suitable shell is created around the mold, molten metal is poured directly into the shell through a shaped cemented into the shell during its fabrication. The sacrificial core is molten or vaporized and the shell is extracted from the newly cast part during the clean-up process.

Building up the successive layers of ceramic material around the mold requires a sequence of repetitive steps of dipping the molds into various mixtures of glue/cement slurries and then surrounding the coated mold with fluidized sand and drying. The duration and environmental conditions of each drying step, in conjunction with the type of sand applied to the specialized slurry coating greatly affects the properties of the final shell created. Therefore, specific "recipes" are designed for each particular casting shell part to achieve each shell's desired properties.

Due to the many variations within recipes, automation of shell manufacturing is complex. Robot manipulators, fluidized barrels or rainfall sanders, temperature controlled ventilation fans, and conveyors carrying wax or foam molds must work in a coordinated effort to make a desired casting shell in accordance with a specified recipe. Furthermore, different types of shells for casting different types of metal parts are often made on the same shell assembly line, utilizing the same machines. In order to automate manufacturing of the various types of shells on one assembly line, "cells" of processing machines must be able to automatically recognize what type of shell has entered the production line and automatically configure their processing steps in accordance with a particular recipe associated with the shell part. Typically, this will entail automatic recognition of the shell part through radio frequency or bar coded tags affixed to the part. Also, multiple conveyors must move in a coordinated effort, sometimes throughout a large facility, to and away from each processing cell.

Previously, during the evolutionary advancement of industrial controls, robot manipulators and other processing machines included relatively simple programmable memory which was preprogrammed to initiate tasks in response to external conveyor sensors. Little or no communication occurred between each machine and overall system level control rudimentary. These machines were therefore mostly autonomous and acted as a master with respect to any connected programmable logic controllers (PLCs). The PLCs were simply programming conduits through which individual robots could be programmed.

In response to the necessity to coordinate robot and machine actions, newer systems have included real-time databases on the factory floor to which machines are connected through PLCs. In these types of "real-time" systems, a processor, typically the CPU in a Personal Computer located on the factory floor, accesses data elements in a resident database and in response issues commands to the machines through the PLCs. In these newer arrangements, machines and manipulators receive their movement instructions through the PLCs, which act as a bi-directional pass-through multiplexer to which multiple robot and machines might be connected.

However, high speed complex processing on a factory floor tends to be less reliable than remote processing away from resident electromagnetic pulse (EMP) interference. Furthermore, factory floor data communications necessitates multiple error correcting protocols and hinders the speed at which data may be transmitted. For example, Allen Bradley's well known Data Highway Plus™ network transmits data at 240 k bits/sec for networks extending to 10,000 feet. This is slow in contrast to the nominal local area networks which transmit data a 10 to 100 Mbits/sec rate. Currently, with the addition of proper shielding, such networks are beginning to be installed directly on the factory floors allowing increased data communications rates between PLCs. However, older, more reliable networks, such as the DH+ are the norm, and the added shielding expense and increased error rates are prohibitive.

For complex investment casting shell handling operations in which dozens of machines, sensors, and conveyors, in dozens of different processing cells must communicate, factory floor networks limit the processing power of the CPU accessing the real-time data from the floor network. Moreover, complex processing in an application server or PC results in limiting factory floor operations by making the distributed PLCs dependent upon real-time commands from a control application running on the server.

From the foregoing, modem casting shell systems require an information topology and method in which complex processing can be removed from the factory floor and commands automatically distributed to PLCs on the factory floor in a predictive manner, and from which sensor and status information can be retrieved and displayed at remote locations. In effect, a need exists for a factory processing system in which distributed PLCs on the factory floor become individual master controllers over machines in associated individual processing cells, and from which a remote industrial control application server may service a plurality of individual master PLCs on a factory floor at the request of an individual PLC.

SUMMARY OF THE INVENTION

It is the object of the present invention to provide a predictive industrial control system in which a computer server can access and process information from local and remote databases and then pass groups of commands to programmable logic controllers on a factory floor upon request.

Another object of the present invention is to provide an autonomous control topology in which groups of commands may be downloaded into programmable logic controllers on the factory floor for controlling connected machines.

A further object of the invention is to provide an industrial control system in which programmable logic controllers on the factory floor act as master controllers for cells of connected machinery.

A still further object of the present invention is to provide a unique control word format or encoding casting shell processing commands.

Another object of the present invention is to provide processing scalability of multiple processing cells in response to increased production activity.

And yet another object of the present invention is to provide distributed processing on an industrial production line through multiple programmable logic controllers.

In summary, the invention is an industrial control system for controlling individual cells of machines through multiple PLCs in an investment casting processing and handling operation. An application server located in a remote, non-industrial environment executes an industrial control application (ICA) utilizing tagged reference names corresponding to individual machines and information input devices such as sensors on the production line. The ICA accesses local databases including a Dynamic Data Exchange (DDE) database for holding PLC control status information and a Structured Query Language (SQL) database for holding casting shell part numbers and their associated recipe control words. The ICA monitors the DDE database and as a new shell part number appears on a load conveyor in the production line, Radio Frequency (RF) tags on the part update the DDE database and signal the ICA to transfer the appropriate recipe control words and robot moves required to process the part to the primary processing cell's PLC. The PLC then controls each machine in accordance with the downloaded commands from the ICA. The control program downloaded into the PLC at boot-up is written such that machines connected to the PLC may operate independently from the ICA during a selected number of dip cycles. Since processing instructions are downloaded in a predictive manner well ahead of any situation requiring new instructions, the processing of the ICA instructions on the remote server or communications on a relatively slow multiple error correcting protocol network such as DH+ does not limit the processing throughput each cell; and therefore, the production line throughput. Furthermore, the system allows for alteration of the sequence of processing steps from automatic to manual modes at will without seriously hampering the system throughput.

Other features and objects and advantages of the present system will become apparent from a reading of the following description as well as a study of the appended drawings.

BRIEF DESCRIPTION OF THE DRAWINGS

An investment casting shell handling and processing control system incorporating the features of the invention is depicted in the attached drawings which form a portion of the disclosure and wherein:

FIG. 4 is a screen display from the ICA of a representative recipe listing showing casting part descriptions and their associated recipe numbers saved in the SQL database;

FIG. 5 is a screen display of the individual dip cycles and associated robot commands and dry times for a representative casting part;

FIG. 6 shows a screen display listing a subset of robot commands and their associated descriptions;

FIG. 7 shows another screen display listing a second subset of robot commands and their associated descriptions;

FIG. 8 is an example control word resulting from an individual dip cycle displayed in FIG. No. 5;

FIG. 9 is a formatted listing of a subset of the contents of the PLC memory showing the memory image of a logical device;

DESCRIPTION OF THE PREFERRED EMBODIMENTS

For purposes of illustration the present invention will be described in with reference to an investment casting core coating operation; however, it is to be understood that the invention may be utilized in other materials handling applications wherein distributed control networks can be employed.

Figure 1:
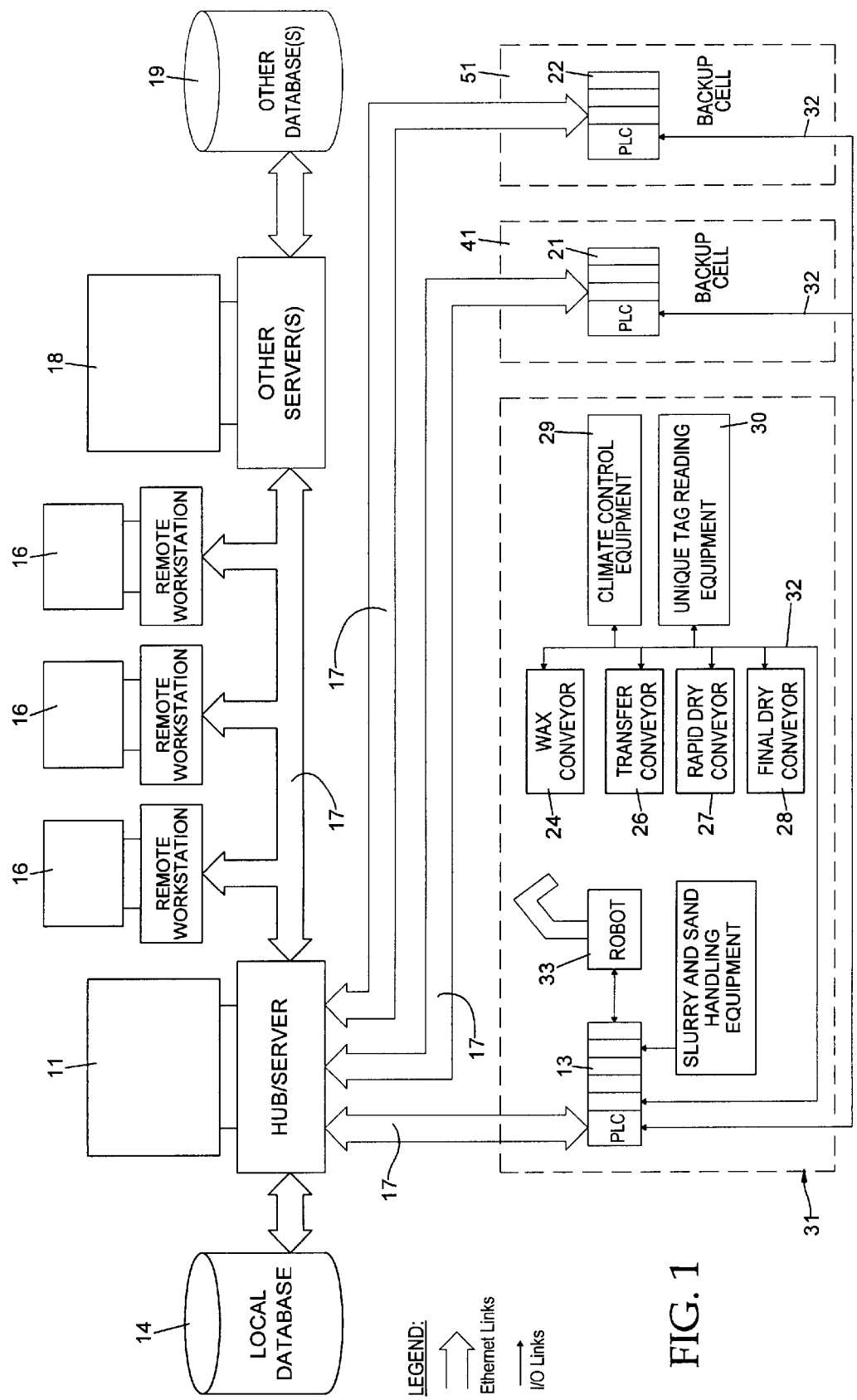
FIG. 1 is a topological diagram showing the different logical elements of the control system and the relative flow of information between them.
Figure 2:
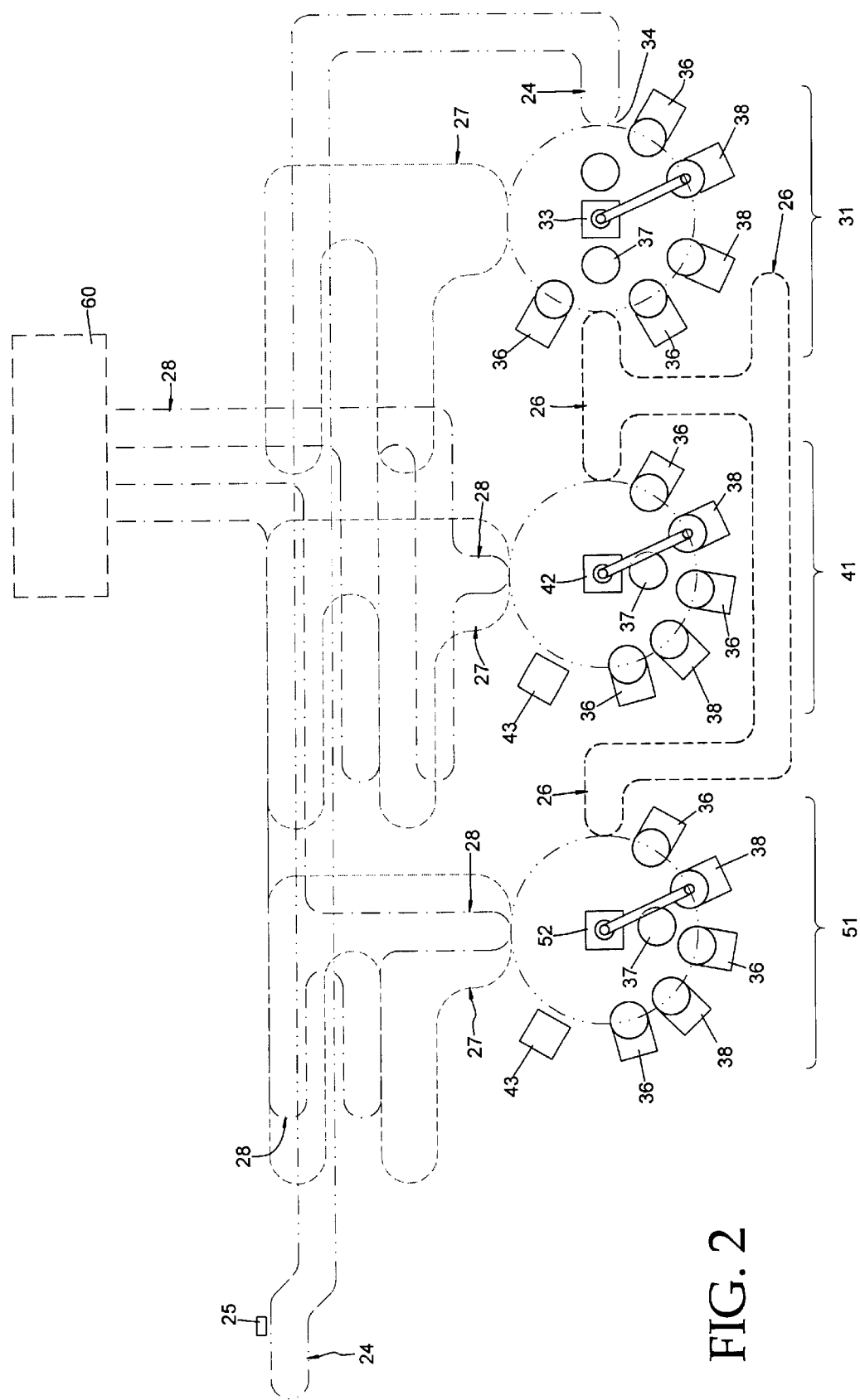
FIG. 2 is system diagram of a typical investment casting conveyor system with multiple processing cells.

Referring to FIGS. 1 and 2, a prefabricated core C is input into the system at a loading station on a hanger to be carried by a load conveyor 24 which may have any number of hangers and cores thereon at any given time. Sensor such as a photo scan, bar code, RF scanner immediately reads a "tag" on the core hanger. Load conveyor 24 delivers core C to a primary processing cell 31 where core C is to be coated as referred to above. Primary processing cell 31 includes a robotic manipulator 33 under the control of a primary processing cell programmable logic controller (PLC) 13. Robotic manipulator 33 is positioned to move a hanger and associated core selectively to positions within its reach where a variety of processing units, the function of which are well known in the industry, are located including one or more slurry tanks 36 having a predetermined coating composition therein, one or more barrel sanders 43, one or more rainfall sanders 38, and a pre-wet tank 37. Manipulator 33 can also position the hanger and core at a pick up zone for placement onto a rapid dry conveyor 27, a final dry conveyor 28, or a transfer conveyor 26. One or more back-up processing cells 41, 51 are provided having all of the components described with reference to primary cell 31, except that transfer conveyor 26 is common to all processing cells. In FIG. 2, the final dry conveyor 28 at cell 31 is not shown in the interest of claimant. The final conveyor 28 of each processing cell connects to an Unload station 60. Each processing cell has its own PLC which controls the manipulator and processing units described; however, Transfer conveyor 26 is under the control of PLC 13 of the primary processing cell 31. An exemplary PLC suitable for the purposes of the present invention is the Allen Bradley SLC-500, 5/05 series. A robotic manipulator suitable for the purposes of the present invention is an IRB 4400 manufactured by Asea Brown Boveri. For the purposes of the present invention a manipulator is required which has on-board memory and processing such that a number of movements can be "taught" to the robot and stored in memory for selective recall. These taught movements are the building blocks for the system as hereinafter described.

The various components hereinabove described are connected by a network 17, that is to say, electrical connections for passing data and control signals to and between various components. Typical connections between PLC's and units under their control will be by serial connection such as RS-232 or RS-485 links, Ethernet®, or other suitable links. The PLCs will also be connected to each other by such links. A description of the physical interconnection is not deemed necessary, such being well known in the art.

With the foregoing system components operably connected to process cores from the loading station through the processing cell to the unload station, the novel features of the invention will now be described. It should be understood that each movement of a robotic manipulator is stored at the robot and can be electronically retrieved and replicated by the robotic manipulator upon an appropriate coded command from the associate PLC. Likewise, each processing unit can be activated, indexed, or otherwise appropriately controlled by the PLC. Each type core and shell component will have a different processing sequence which consists of a plurality of movements of the manipulator and associated actions by the processing units called dip cycles and drying times after each dip cycle. Knowledge of the resident robotic movements and the retrieval codes allows the cell and the units therein to be controlled based on the type core and shell desired. To achieve a distributed control network which allows seemingly autonomous work by each cell, we have devised a control network including a server 11, wherein an industrial control application or program is stored and executable, a local database 14 in which a dynamic database memory in which a dynamic database exchange (DDE) database is maintained, and a Structured Query Memory in which a Structured Query Language (SQL) database is maintained. The SQL database contains core part numbers and control words as described hereinafter. The DDE database contains constantly updated status information from each cell and conveyor. Each hanger has machine readable indicia on it, e.g. bar code, RF Tag. Inasmuch as each type core will have a specific processing sequence, information on the sequence can be used to define which processing units are required to perform their operation on the core. By digitally defining each processing cell and certain of its components a control word can be generated which carries encoded information about which robot is allowed to execute a particular dip cycle and which conveyor the particular type core is to be picked up from and set down on. A recipe for each type core is thereby defined by the sequence of dip cycles and the code word for the core. For each type core to be handled by the system a recipe is stored in the SQL database. Accordingly, the recipe for a core can be associated with the hanger bearing it by the indicia on the hanger.

Likewise, by defining each position in the system and each hanger by its indicia, the DDE database may be constantly updated to provide information about the status of the entire system. Sensors can be located throughout the system to identify and track hangers in the system. The output of these sensors can be used as control signals or database entries to the DDE database.

Referring to FIG. 1 for a better understanding of the function and structure of the invention, the control system 10 includes an industrial control application (ICA) running on an application server 11. The ICA includes capability for tagging and communicating with various elements within the system. The ICA also has the capability to access multiple databases simultaneously and allow a user to alter the system's function and input new information in the databases on the fly. One example of an ICA capable of accomplishing these goals is the industrial control program InTouch™ produced by Wonderware® Inc. Running under a Microsoft® Windows™ operating system, InTouch™ allows for the creation of a graphical man-machine interface (MMI) showing the investment casting system's components. Each graphically represented component has an assigned address tag name compiled into a data dictionary for storing of all system components in a database. Also, processing recipes (see FIG. 5) may be created for each casting part that is to be produced that contains a sequence of control words (see FIG. 8) that are in turn downloaded into an appropriate Programmable Logic Controller (PLC) 13 at the appropriate time (See FIG. 9). The format of the screens in the MMI, the data correlation functions, tag names, control functions, the database formats, and the general system interaction among the communicating components through the ICA, including the data word formats, are designed by the user and are not pre-created by the ICA. In addition to an MMI, InTouch™ includes utility programs to interface with and export to Dynamic Data Exchange™ (DDE) and Structured Query Language™ (SQL) databases in local database 14. The parts recipes are typically stored in the local SQL database, and component interface commands and component status are typically stored in the DDE database. Storing the ICA information in DDE and SQL compliant database, such as Microsoft Access™ or Oracle™, allows remote access and manipulation of system information from remote points on the network. Given a functional Windows™ network, remote client work stations 16 running restricted client InTouch™ software can access the database across a high-speed network, such as an Ethernet® network, develop and load new recipes for new casting parts, and display the current status of machines connected to a PLC on the factory floor. Client nodes are not necessary for the control systems operation; however, they allow for increased efficiency for additional workers to prepare new recipes in accordance with installed factory floor components. Other applications not a part of the novelty of the present invention may be stored and run on other application servers 18 which may access, in turn, other databases 19 present on the network. Further discussion as to the working of the Window™ interface and a description as to interaction within the Windows™ operating system between the databases and the ICA are omitted inasmuch as this information is well understood in the industry and not pertinent to an understanding of the present invention. Further information regarding the operation of individually referenced software and hardware components are readily available from a reading of the references citedin this specification.

Communication from the application server 11 to individual PLCs on the factory floor is accomplished over any number of user selected networks. As may be seen in FIG. 1, communications links from the server 11 to the PLCs 13, 21, 22 may be high speed networks if the connected PLC has such capability. Application servers often have an installed interface card as for example a 5136-SD manufactured by S-S Technologies, Inc. so that communication to the PLCs may be seamlessly accomplished over a local network while maintaining higher speed Ethernet® communications among higher level processing elements such as databases 14 and client nodes 16. Regardless of the connection method between the server and individual PLCs in the system, higher speed communications over Ethernet® type networks among remote components such as the databases, servers, and client nodes would remain.

One PLC having the capability to communicate to a server over a high speed Ethernet® network is the Allen Bradley SLC-500, 5/05 series which is well known and well understood in the industrial control art. Further references to PLC internal elements and capabilities shall be made with respect to the Allen Bradley SLC series which has set industry standards through its wide acceptance as an industrial controller. Most industrial controllers either emulate or simulate SLC-500, 5/05 type features.

Local I/O communications (32) from PLC to PLC, PLC to a cell robot, PLC to conveyors, and PLC to other cell processing machines may be accomplished via RS-232, RS-485, or DH+ communication links depending upon installed adapter cards in each PLC. Local I/O communications occur asynchronously relative to communications with the ICA on the server. In an operational system using all of the above components, the ICA can obtain and write to the DDE database a complete image of each PLC's memory contents. The combination of the data dictionary tags with the system DDE PLC memory images allows the ICA to display and process information obtained from all components in the system at any instant.

Referring to FIG. 2 for a better understanding of typical system components in an investment casting operation, a system of conveyor loads 24, transfers 26, and holds (27–28) parts for drying as they proceed through the plant. In a casting shell handling system, special hangers hold the mold parts to be processed on an elevated conveyor to facilitate processing and handling by robots. The load conveyor 24 has sensors for reading radio frequency tags or bar coded tags on the wax or foam mold parts as they are loaded. Also, photo sensors are present at pickup and set down points on conveyors adjacent to robots so that a robot knows through its communication with the PLC whether a hanger holding one or more shell parts is presently at a pickup or set down position.

Through the MMI on the application server's workstation or on a remote client node, an operator associates the casting part's tag number with a particular casting part description already resident and loaded in the SQL parts database. Typically, the association process may be done well ahead of the time of actual loading of the part on the loading conveyor; however, an operator may also associate the tag number with a part description via a remote terminal adjacent to the entry point of the part at the loading conveyor 24. Alternatively, the operator may simply enter the part number affixed to the mold part which has already been associated in the SQL database from which part number association will occur automatically in the ICA. Tag numbers entered and associated either at time of loading or prior are stored in the remote database 14 for access by the ICA over the high speed network.

After loading a selected part on the load conveyor 24, the ICA recognizes that a part has been loaded on the load conveyor 24 and downloads the processing information associated with the particular part to the primary cell PLC 13. PLC 13 controls all of the machines associated with processing a part in its cell via the local I/O network. PLC 13 also controls the load conveyor 24 and the transfer conveyor 26, and maintains a complete mold parts image of each part loaded on any of its conveyors, including the transfer conveyor 26. Back-up cells A 41 and B 51 process shell parts in accordance with the primary cells' inability to process a dip cycle for a part loaded on a conveyor controlled by PLC 13. As will be seen, back-up cells may perform interim dip steps in a particular recipe in the event that the primary cell is busy or does not have a processing machine available for the next dip cycle. Each PLC in the back-up cells A 41 and B 51 control their own adjacent set of rapid dry and final conveyors, any environmental equipment surrounding the conveyors, and the initiation of each of their cell's processing machines. The primary PLC 13 also controls these elements in its own cell.

Figure 3:
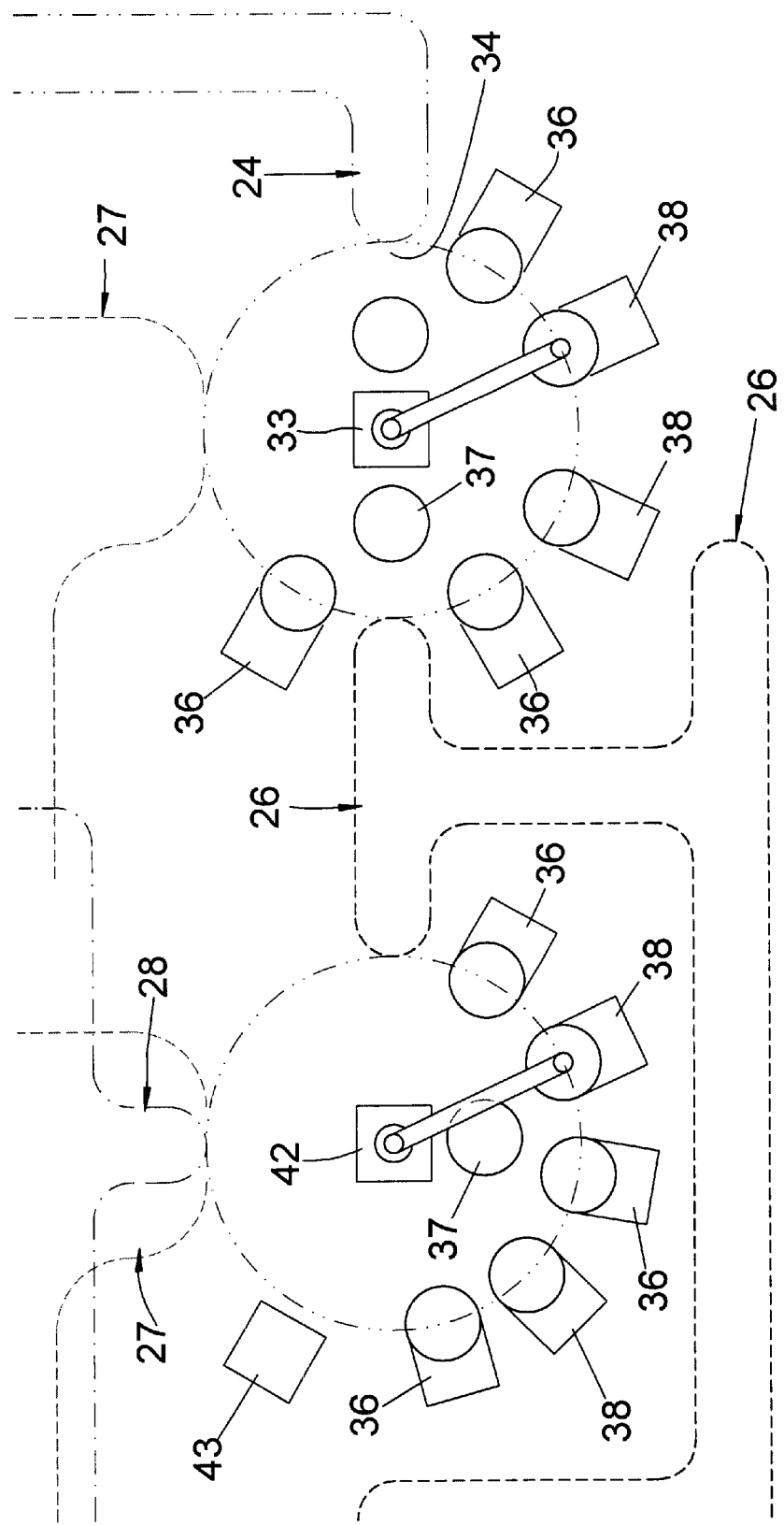
FIG. 3 is an magnified view of a processing cell showing its individual components.

As seen in FIG. 3, each cell consists of a grouping of machines connected to a master cell PLC (13, 21, 22). Each machine communicates with their respective master PLC via a local I/O network 32 as previously described. A central robot 33 moves wax or foam molds from the load conveyor 24 at the off-load station 34 and to a processing machine as dictated by a dip cycle held in individual shell part recipes, which are downloaded via the ICA into the PLC 13. As is well known in the industry, various types of machines are used in each cell of a casting shell processing plant. Pre-wet 37 and slurry tanks 36 supply premixed coatings into which a casting mold is dipped so that sand or other particulate materials will adhere to the mold. Rainfall 38 and barrel 43 sanders provide a means for fluidizing sand around a mold so that all surfaces of the coated mold are covered with sand (or other particulate material) without damaging it. Rapid dry conveyors 27 convey coated parts to climate controlled rooms for drying between dip cycles in accordance with pre-selected drying conditions. And final dry conveyors 28 move completed shells to an unloading area 60 and for extended drying. Further comment as to the use and operation of individual machines used in the processing of casting shells will be omitted inasmuch as it is not pertinent to an understanding of the present invention.

Referring now to FIG. 4, it may be seen that the ICA may be programmed with a multitude of casting shell recipes. The listing shows a specific recipe number, the maximum number of dip cycles, and a description of the metal part that will be created in the completed casting shell. The ICA allows selection and editing of a particular recipe as for example the vane segment part as listed in FIG. 5 showing its associated recipe No. 11345. As shown in the figure, individual dip cycles are broken down in fields listing the applicable cell robot, which conveyors the shell shall be retrieved from and delivered to, dry times on the applicable conveyor, and a series of associated robot commands pre-stored in the applicable cell robot's memory. By way of example, dip cycle 3 for recipe No. 11345 for a vane segment indicates that backup robot 52 of cell B (51) will execute robot subroutines 403, 428, and 700. Robots used in casting operations have their own on-board memory storage and processing for robot moves. Various types of teach pendant applications allow for the storage of various robot moves in the robot memory. A succession of moves in a pre-selected coordinate system may also be stored in the robot's memory as numbered subroutines and referenced for execution by number.

A typical robot used in casting shell handling systems is an IRB 4400 manufactured by Asea Brown Boveri (ABB).

A robot from the IRB 4400 series has its own computing and I/O resources similar to a PC, and usually includes preloaded high-level application-oriented programming language interpreters and debug procedures for creating separate numbered robot movement subroutines. For example, as shown in FIG. 6, subroutine 403 in dip cycle No. 3 commands the robot's arm to move the 11345 shell into a concrete slurry tank for a predetermined soaking period. Subroutines 428 cause the robot to execute a series of moves to accomplish a draining procedure from the slurry tank, and 700 (FIG. 7) causes the shell to be sawdusted. As shown in FIG. 9, the drying time prior to proceeding to the next dip cycle is 50 minutes. Each of these robot subroutines were created and stored specifically to accommodate a specified shell mold part.

Each dip cycle listed in the ICA generates a unique 16 bit control word as shown in FIG. 8 which, in association with the robot moves and drying time for that cycle, holds all the information needed to perform that particular dip cycle. Referring to our previous example, dip cycle 3 generates the control word 0001001010001000 which is $4744_{base\ 10}$. Bit 15 indicates whether the PLC is ready for the ICA server to transmit the next control word and robot moves in the next dip cycle to the PLC. The ICA monitors the image of each PLC on the network via the DDE database in order to provide information to PLC upon request. Upon finishing the last move specified in a dip cycle, the robot issues an END OF CYCLE command to the PLC (as it does after the completion of each robot subroutine) and the PLC updates bit 15 to a 1. The ICA running on the server then transfers the next dip cycle to the PLC, overwriting the previous dip cycle's memory location in the PLC. Bit 15 has an important function in that it allows a PLC to be updated by the server for the next dip cycle during the time that that part is drying, but without inhibiting the PLC from proceeding with other dip cycles of other parts. Bit 15 also allows a reduced amount of memory to be kept in a PLC regarding each dip cycle without reducing the continued autonomous activity of the cell.

Bits 14–12 specify a processing robot as selected in the ICA interface. Multiple Is in bits 14–12 can indicate (though not in this example) that multiple robots are allowed to execute a particular dip cycle. Bits 11–10 are reserved, and bits 9–6 and 5–2 indicate which pick-up and set down conveyors the shell may be retrieved from and delivered to, respectively. As shown in FIG. 2, each processing cell has its own rapid dry conveyor and final dry conveyor. Therefore, bits 4–3 necessarily refer to each robot's respective conveyor onto which a part is to be deposited. Bit 1 is the last cycle indication flag which is updated in the PLC by the server upon reaching the maximum number of dip cycles as specified by the recipe. Bit 0 is set by a human operator through a remote terminal that will remove a hanger from the final dry conveyor after the shell has sufficiently dried. Setting the bit 0 to 1 causes the ICA to remove all references to mold part in the dynamic parameters of the system, but without affecting any previously created history files listing processing history of a finished part.

FIG. 9 shows a snap shot of the PLC's memory listing the information necessary for the cell to autonomously perform the next dip cycle 4 on part No. 11345 that was loaded into the primary PLC at time of entry of the part into the handling system. Each PLC has memory allocated to every hanger holding a mold part on its respective conveyors. That memory includes the previously discussed control word code 4744, which is the decimal equivalent of the control word, an associated RF tag number, the next dip number, the current move number, current and next dry times, a hanger status bit (0=enable, 1=disable), the prescribed robot moves for the dip cycle, and some environment information such as temperature, relative humidity, speed of drying fans, etc., pertinent to the process of dipping the mold part.

PLCs such as the Allen Bradley 500 series separate memory allocation into processor image files and scanner I/O image files. This type of architecture allows a PLC to continually update its scanner I/O memory in discrete transfers independently of the PLC processor's operation of updating its own memory.

The memory of the PLC is preassigned addresses in accordance with all of the discrete positions on conveyors controlled by the particular PLC. Likewise, the downloaded information for each core contains the control word, dip cycle member, drying time, robot moves, control parameters in the drying zone controlled by the PLC.

FIG. 9 shows a formatted view of the previously described control word for part No. 11345 after loading into the PLC memory. This is in fact the logical image of various conveyors the PLC interfaces with. Memory is divided into groups of 16 bit words. Each core type is assigned 1 group made up of 1 or more 16 bit words.

Figure 10:
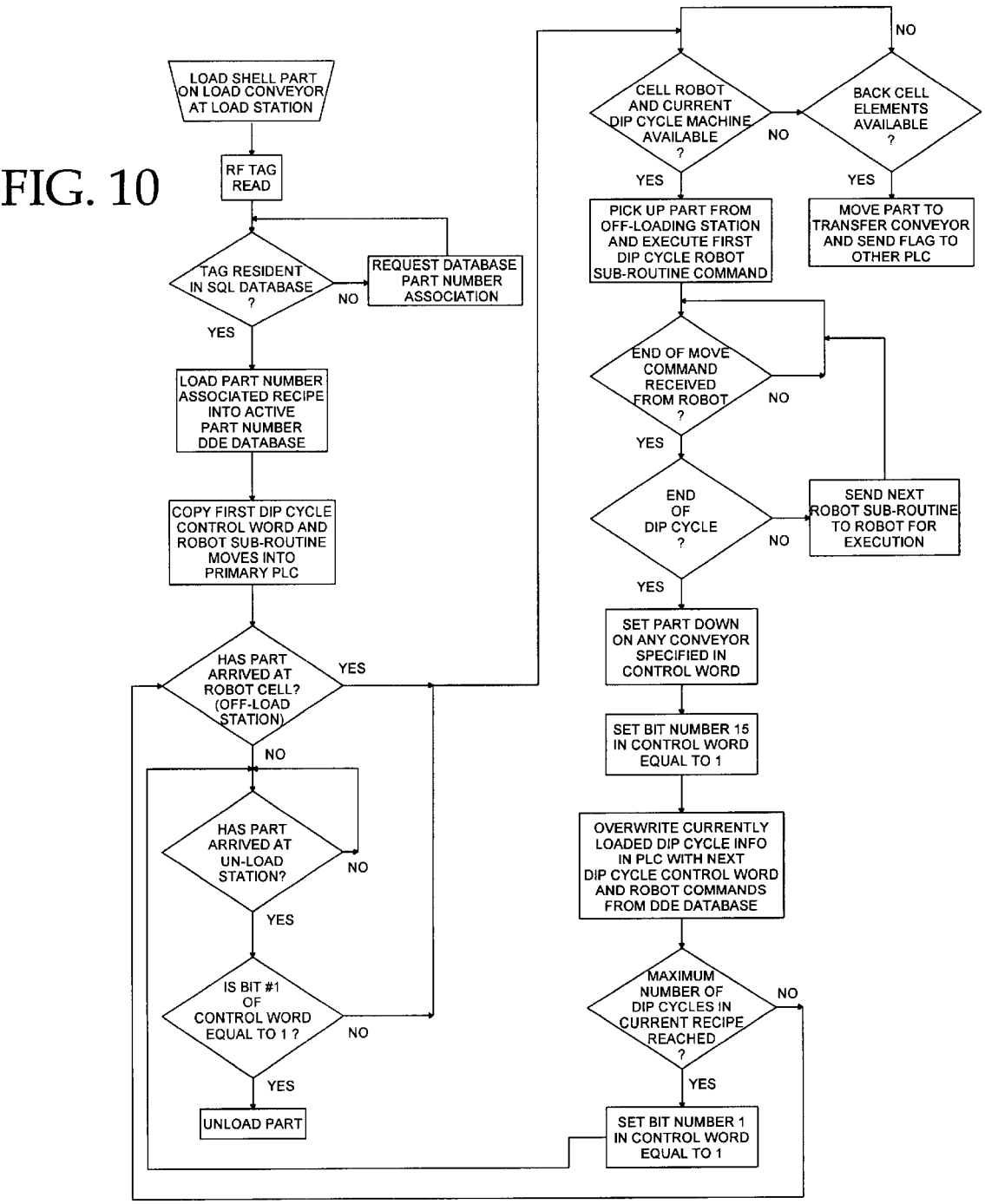
FIG. 10 is a logical flow diagram showing the sequence of actions of a cell in response to the loading and arrival of a casting mold part at the cell for processing.

FIG. 10 shows a logical flow of a typical load and process operation. As a new casting mold part is loaded on the load conveyor 24, an RF sensor reads the parts associated tagged part number and passes it to the PLC. The DDE database 14 is, in turn, then updated and the ICA compares and matches the tag number with a pre-loaded part number recipe in the SQL database. The ICA then transfers the mold part's first dip cycle to the primary cell 31 PLC 13 in accordance with the information structure displayed in FIG. 5. The PLC 13 writes to the memory to hold the first dip cycle information in accordance with FIG. 9. This occurs well ahead of the arrival of the casting mold part at the primary cell 31, because the cell is either already processing other parts, or because of the delay of the part in getting to the pickup point at the cell robot. The cell will continue to process any other parts previously received in the cell as the part travels on the load conveyor 24 toward the primary cell 31, which is the first cell to encounter the newly loaded mold part. Upon arrival at the pickup station adjacent to the primary cell's robot 33, a photo sensor signals the PLC 13 that a mold part has arrived for processing. The pickup station may also include another RF tag reader to facilitate part recognition. PLC 13 identifies which part is waiting on pickup station either by comparing the tag number of the newly arrived part with its own internal memory, or simply calculating which part has arrived through an index pointer which had been continually updated in the PLC's logical image area of the load conveyor.

After arrival and identification of the mold part at the cell, the PLC 13 analyzes the control word for the arrived part and ascertains the availability of the robot 33 and the cell's conveyors. If the robot and a designated set down conveyor are available, the PLC sends a pickup command move number to the robot 33 and sends the first dip cycle's robot move subroutine already residing in its memory. Other associated devices such as slurry tanks 36 and sanders 38 are initialized in accordance with pre-set parameters or information downloaded by the ICA from the recipe database, and also in response to I/O signals generated from the robot and received by the PLC. As each robot subroutine is completed in the dip cycle, an END OF MOVE signal from the robot causes the PLC to send the next move command number to the robot. After the robot has finished the last move command in the current dip cycle, the PLC generates a set down command to the robot to place the mold part on one of the specified conveyors for drying.

Upon completion of the current dip cycle and after the hanger holding the mold part has been set down on an appropriate conveyor for drying, the PLC sets the READY FOR DATA BIT No. 15 in the control word to a 1 and the server, which is constantly reviewing the PLC's memory image in the DDE database, writes over the existing dip cycle PLC memory with the next dip cycle control parameters.

It may be apparent from the foregoing control word structure and system topology that by placing a partially completed casting shell on the transfer conveyor 26 between dip cycles, cells may "compete" for the opportunity to execute the next dip cycle on that part. For example, if primary cell 31 is unable to perform the next dip cycle on a part by robot 33 due to a particular machine called for in the dip cycle being unavailable, or in the event that PLC 13 sees that another cell robot is idle and parts are waiting at the cell 31 pickup zone 34 on the load conveyor 24, PLC 13 can transfer over the local network a signal to another PLC to read the current dip cycle information for the part loaded on the transfer conveyor and process the part's next dip cycle.

It will be apparent to those skilled in the art that with the proper writing of the PLC processor programs, processing of multiple parts simultaneously by incrementally utilizing backup cells is readily achieved. The current system's topology, therefore, lends itself to cell "scalability" in the handling of casting mold parts as the number of parts to be processed exceeds the primary cell processing capability. The system also is self-adapting and can process any number of different types of shells loaded on the system to the extent that the appropriate processing machines are present in any cell in the system.

Since each PLC present in each cell in the system has at any instant in time a complete image of any mold parts waiting on its respective conveyors with their associated next dip cycles, the system can operate for extended times without communication with the ICA server. A single dip cycle can take several hours to complete, depending upon the recipe, but server malfunctions, network and ICA errors will not affect the continued processing of parts already loaded in the system. Moreover, from an overall system throughput standpoint, the speed of processing of shells in the system is not dependent upon the ICA server's ability to transfer large amounts of data over a network. Once recipe processing data has been downloaded into a PLC, that PLC will become the master controller for processing that shell in the system.

The prior descriptions pertain to the handling system when in automatic mode (see FIG. 10). However, adjustments to the system may be made while the system is operational in order that conveyors may be suspended for repairs, or in order for re-prioritizing shells for processing midstream. In order to achieve these tasks, part of the system may be shifted into a manual mode as such that each robot or conveyor affects becomes "invisible" to the system, with all other components continuing to operate using available resources.

In automatic mode, as previously described, each PLC sends signals to each conveyor in conjunction with the numbered robot moves sent to their cell's robot during a dip cycle, and each conveyor controlled by a PLC is indexed or inhibited during a dip cycle.

By way of example, a core is introduced to the system on a hanger proximal sensor 25 on load conveyor 24. The ICA receives the "tag" information from sensor 25 and matches the control word for the core type with the recipe control words stored in the SQL database and updates the DDE database. Information from the SQL, i.e. the recipe is sent to the PLC network immediately. PLC 13 then increments conveyor 24, such that in due course the subject core and hanger reach off-load station 34, at which point PLC 13 matches the "tag" read with the recipe control words previously downloaded for the core. In keeping with the prior examples, recipe 11345 would be implemented for the core meaning that robot 33 would move the hanger to conveyor 26 which would deliver the hanger and core to cell B where robot 52 would off-load the hanger and core for processing. In cycle 1, robot 52 will implement routine 203, 221, and 500, which have been previously stored in the PLC memory, the associated machinery will be engaged and utilized to build the shell about the core until robot 52 off-loads the hanger core and shell to the final dry conveyor which delivers it to the unload area 60. This sequence is more readily understood with reference to FIG. 10 wherein a more detailed representation in flow chart form is presented. The automated sequencing is presented in FIG. 11 relative to the path analysis procedure used by the system. FIG. 12 presents the empty hanger return procedure in logical format for returning the hanger for reuse with the next core.

Figure 11:
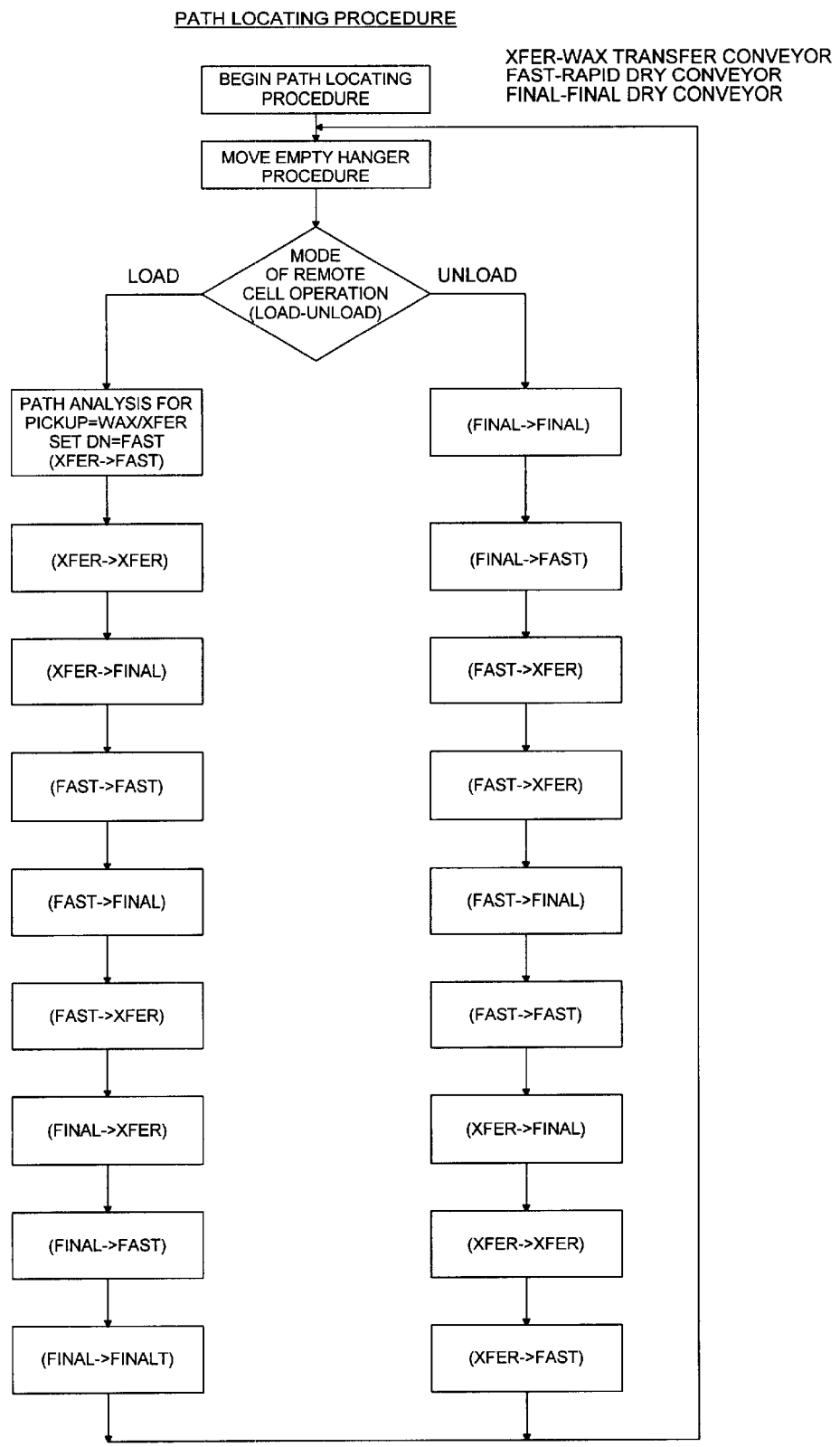
FIG. 11 is a logical flow diagram showing the sequence of path analysis procedure application (see FIG. 12)
Figure 12:
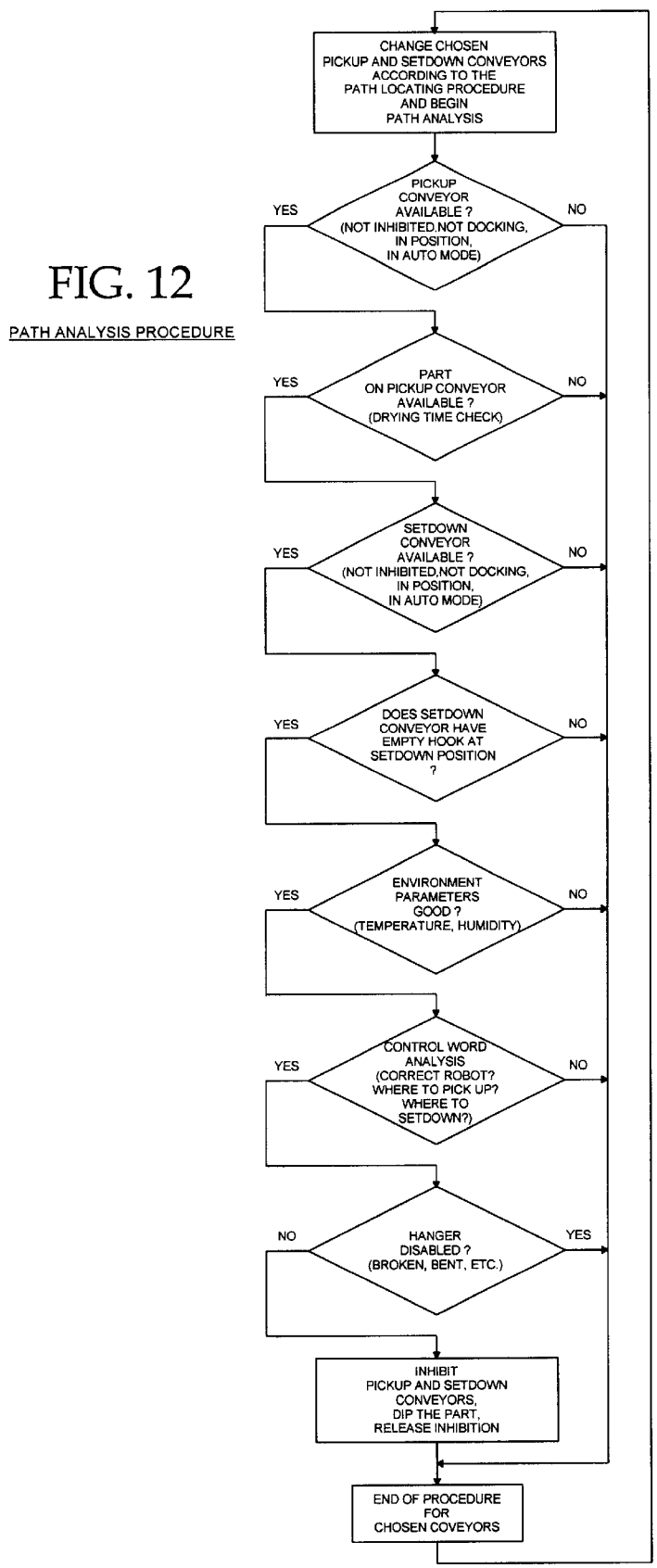
FIG. 12 is a logical flow diagram showing the Path Analysis Procedure.
Figure 13:
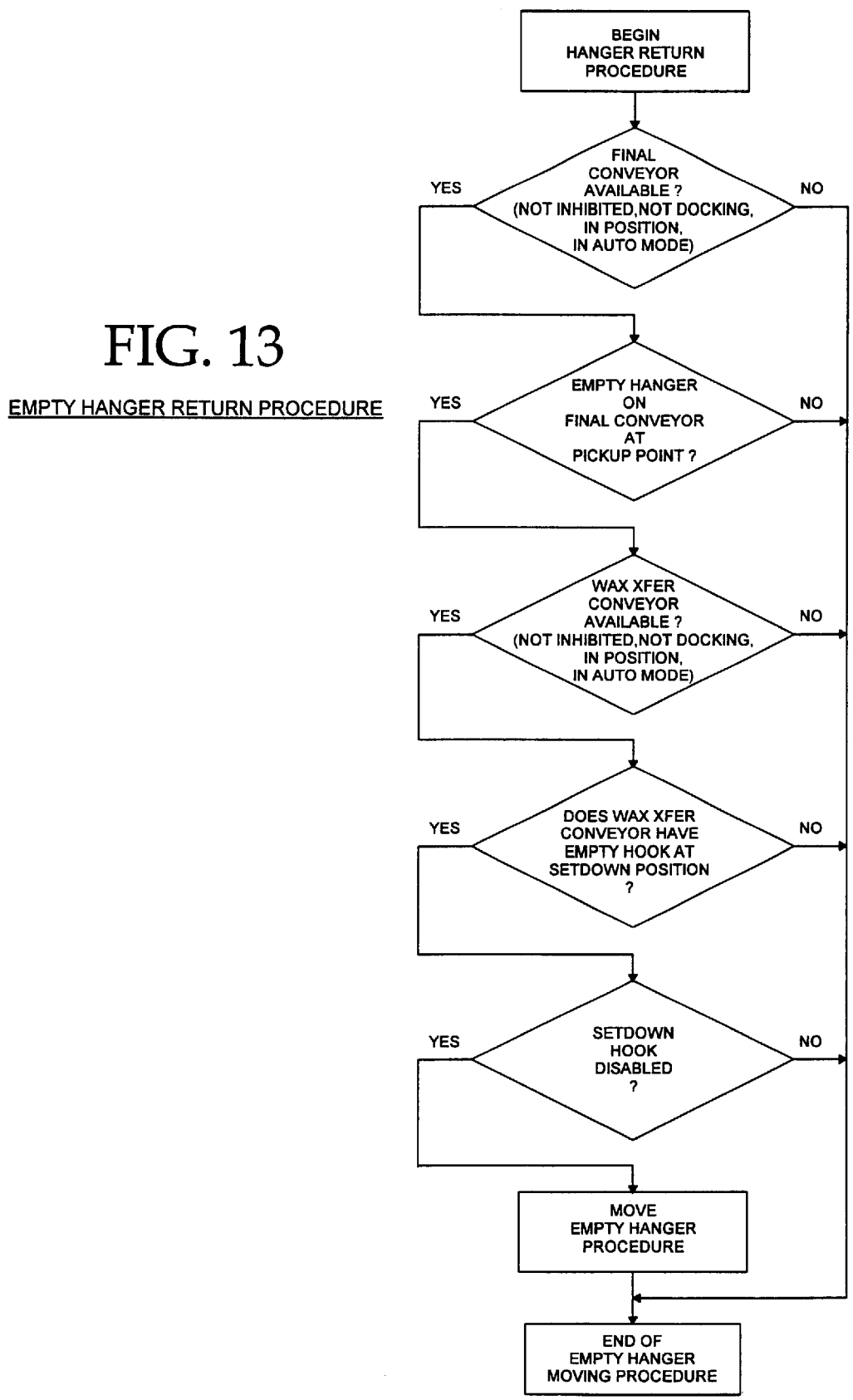
FIG. 13 is a logical flow diagram showing the empty hanger return procedure.

As will be understood, FIG. 11 illustrates the general decision path as the product moves through the process determining which conveyor type is required; however, with each conveyor pair shown in FIG. 11 the procedure of FIG. 12 is executed to properly determine the path for product at any given time such that the product is always sent to an available path for pick up and set down relative to the required conveyors.

In order to increase efficiency in the system, a designated status PLC may reside on the production floor to gather information as to the status of various critical areas in the production line via the local I/O links to each PLC. Since a memory image of each PLC is maintained in the DDE database, the ICA may monitor the status PLC's image and send commands to individual PLCs to reorder dip cycles and processing of parts, thereby increasing throughput of the processing line.

As is apparent, the configuration of the number of cells, the number of conveyors, and the interaction of each cell through multiple transfer conveyors will change in response to the needs of a particular casting shell operation. Also, while the present embodiment uses a single primary PLC that receives all incoming loaded mold parts and controls the distribution of parts loaded on the transfer conveyor, it is envisioned that multiple primary PLCs may be used on multiple incoming load conveyors. The current invention's topology can accommodate variations of this sort with minor variations in the PLCs' processor program. Therefore, while the invention is shown in one preferred embodiment, it will be obvious to those skilled in the art that it is not so limited but is susceptible to various changes and modifications in the cell and conveyor configuration without departing from the spirit thereof. Furthermore, the herein disclosed elements and system architecture can be applied to any form of assembly production line such as, by way of example, automobile assembly, plane assembly, textile manufacturing, electronics assembly, and food packing.

REFERENCES

ABB FLEXIBLE AUTOMATION INC., ABB ASEA BROWN BOVERI, ART. No. 3HAB 0009-69 ISSUE M94A/REV. 1, PRODUCT MANUAL IRB 4400 (1994).

ALLEN-BRADLEY, INC., PUB. NO. 1747-6.2, SLC 500 MODULAR HARDWARE STYLE INSTALLATION AND OPERATIONS MANUAL (1995).

ALLEN-BRADLEY, INC., PUB. NO. 1747-6.6, REMOTE I/O SCANNER USER MANUAL (1996).

MICROSOFT CORP., P/N 097-0001788, MICROSOFT SQL SERVER RESOURCE GUIDE (1997).

S-S TECHNOLOGIES, INC., SDMS.DOC REV. 5.13, 5136-SD USER'S GUIDE (1995).

U.S. STEEL CORP., THE MAKING, SHAPING AND TREATING OF STEEL (7TH ED. 1957).

WONDERWARE CORP., P/N 05-047 REV. I, DDE SERVER TOOLKIT USER'S GUIDE (1995).

WONDERWARE CORP., P/N 05-116 REV. A, EXTENSIBILITY TOOLKIT FOR INTOUCH USER'S GUIDE (1994).

WONDERWARE CORP., P/N 05-158 REV. A, INTOUCH USER'S GUIDE (1995).

Having set forth the nature of the present invention, what is claimed is:

1. An industrial control system for controlling machines processing investment casting shells, comprising:
   a. processing recipe means for describing a sequence of processing steps for a selected casting shell, each said recipe means including a series of dip cycles;
   b. storage means for holding a plurality of said recipe means;
   c. processing means for associating one of said recipe means with a casting shell loaded onto a loading conveyor, said processing means including means for identifying a single dip cycle within said associated recipe means;
   d. programmable logic means for autonomous control over said machines after receipt of said single dip cycle; and,
   e. network means for passing said single dip cycle to said programmable logic means.

2. A control system as recited in claim 1, wherein said programmable logic means comprises:
   a. a processor;
   b. main processor memory;
   c. an executable control program loaded into said main processor memory for processing by said processor;
   d. means for local I/O communications with said machines on a production line;
   e. a scanning memory for asynchronous communication with said machines over said local I/O means; and,
   f. network I/O means for bi-directional communications with said executable control program.

3. A control system as recited in claim 2, wherein said network I/O means comprises a network card installed in a computer workstation, a network card installed in said programmable logic means, and a communications cable connecting said cards, and wherein said network I/O means is capable of sustained communication rates of at least 10 mega-bits/second.

4. A control system as recited in claim 1, wherein said processing recipe means comprises electronically transmissible signals including representations of:
   a. a series of processing cycles;
   b. a single control word contained within each said cycle; and,
   c. a least one numbered robot subroutine specifying one or more robot moves in each said cycle.

5. A control system as recited in claim 4 wherein said control word comprises a 16 bit word for specifying processing parameters and for signaling said processing means to transfer a single dip cycle to said programmable logic means.

6. A control system as recited in claim 4, wherein said storage means comprises a bifurcated database for holding said recipe means in one half and production line status information to be held in said other half.

7. An industrial control system utilizing a computer workstation for controlling a series of machines on a production line, comprising:
   a. means for holding a plurality of control parameters;
   b. means for selecting a subset of said control parameters in response to signals received from said production line wherein said selecting means comprises an industrial control application program running on a computer workstation, said application program capable of tagging and communicating with various elements on said production line, and wherein said application program includes a customizable man machine interface for achieving said tagging;
   c. programmable logic means for controlling said machines on said production line after receipt of said subset of control parameters, said logic means capable of autonomous control of said machines independent of activity by said selecting means after receipt of said subset; and,
   d. means for electronically connecting said selecting means to said programmable logic means for communicating said subset to said programmable logic means.

8. In combination with an investment casting shell production line including a computer workstation having means for network communication, at least one processing cell having a central robot and a plurality of processing machines, a plurality of conveyors for moving casting shells to and from said cell for processing, a sensor adjacent one of said conveyors signaling a loading of a new casting shell on one of said conveyors, and a pre-defined set of processing recipes means for describing a sequence of processing steps associated with a selected type of casting shell, an industrial control system comprising:
   a. storage means for holding said set of processing recipes;
   b. industrial control means running on said computer workstation for processing signals from said production line and in response supplying control parameters derived from a selected one of said recipes to said cell;
   c. means for electronically transmitting said control parameters to said cell; and,
   d. logic means associated with said cell for distributing said control parameters to said processing machines, said logic means including processing means for detached autonomous distribution of said control parameters to said processing machines independent of actions by said industrial control means.

9. A control system as recited in claim 8, wherein said logic means comprises:
   a. a processor;
   b. main processor memory;
   c. an executable control program loaded into said main processor memory for processing by said processor;
   d. means for local I/O communications with said machines on said production line;
   e. a scanning memory for asynchronous communication with said machines over said local I/O means; and,
   f. network I/O means for bi-directional communications with an industrial control program.

10. A control system as recited in claim 9 wherein said network I/O means comprises a network card installed in said computer workstation, a network card installed in said logic means, and a communications cable connecting said cards, and wherein said network means is capable of sustained communication rates of at least 10 mega-bits/second.

11. A control system as recited in claim 8, wherein said processing recipe means comprises:

a. a series of processing cycles;

b. a single control word contained within each said cycle; and, c. a least one numbered robot subroutine specifying one or more robot moves in each said cycle.

12. A control system as recited in claim 11 wherein said control word comprises a 16 bit word for specifying processing parameters and for signaling said industrial control means to transfer a single dip cycle to said programmable logic means.

13. A control system as recited in claim 8 wherein said storage means comprises a bifurcated database for holding said recipe means in one half and production line status information to be held in said other half.

14. A control system as recited in claim 8 wherein said processing means comprises an industrial control application program running on a computer workstation, said application program capable of tagging and communicating with various elements on said production line, and wherein said application program includes a customizable man machine interface for achieving said tagging.

15. In combination with an investment casting shell production line including a computer workstation running an industrial control program and having means for network communication, storage means accessible by said industrial control program, at least one processing cell having a central robot, a plurality of processing machines, and a programmable logic controller connected to said robot and said processing machines over a local network said logic controller having a processing memory and a scanning memory, a plurality of conveyors for moving casting shells to and from said cell for processing, a sensor adjacent one of said conveyors signaling a loading of a specified casting shell on one of said conveyors, and a pre-defined set of processing recipes stored in said storage means for describing a sequence of processing steps associated with a selected type of casting shell, a method for said logic controller to manage each machine in said processing cell through a discrete series of dip cycles, comprising the steps of:

a. downloading a single control parameter representing a dip cycle from said computer workstation to said logic controller;

b. setting up a logical device image corresponding to each processing machine specified in said control parameter and loading pre-defined machine settings into said logic image as specified in said control parameter;

c. transmitting said settings to each said machine over said local network;

d. processing a single dip cycle; and, e. moving said specified casting shell to a conveyor for drying.

* * * * *